Dec. 24, 1935.  F. D. FUNSTON  2,025,199
SHOCK ABSORBER
Filed June 23, 1934

INVENTOR
FREDERICK D. FUNSTON
BY
Spencer, Hardman and Felt
ATTORNEYS

Patented Dec. 24, 1935

2,025,199

UNITED STATES PATENT OFFICE 2,025,199

SHOCK ABSORBER

Frederick D. Funston, Dayton, Ohio, assignor to General Motors Corporation, Detroit, Mich., a corporation of Delaware Application June 28, 1934, Serial No. 732,794

10 Claims. (Cl. 188—88)

This invention relates to improvements in hydraulic shock absorbers.

It is among the objects of the present invention to provide a hydraulic shock absorber of simple structure and design, capable of controlling both the approaching and the separating movements of two relatively movable members, namely, the frame and axle of a motor vehicle.

Among the further objects of the invention is to provide a hydraulic shock absorber having two relatively movable portions, one of which is adapted to be connected directly to the frame of the vehicle, the other to the axle of the vehicle.

Further objects and advantages of the present invention will be apparent from the following description, reference being had to the accompanying drawing, wherein a preferred embodiment of one form of the present invention is clearly shown.

Figure 1:
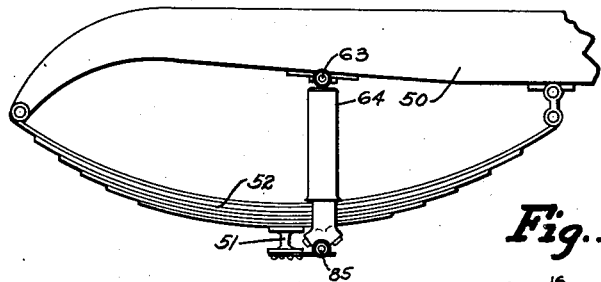
Fig. 1 is a fragmentary side view of a vehicle chassis showing a shock absorber, equipped with the present invention, applied thereto.

Referring to the drawing, the numeral 50 designates the frame of the vehicle which is supported upon the axle 51 of the vehicle by springs 52, only one of which is shown.

The shock absorber comprises two relatively movable members, the one the casing furnishing the cylinder and the fluid reservoir, the other the piston or fluid displacement member. In the present drawing the fluid displacement member is shown connected directly to the frame 50 of the vehicle while the casing providing the cylinder and fluid reservoir is connected to the axle 51.

The cylinder comprises a tubular member 54, the ends of which are closed by cylinder heads 55 and 56. Another tubular member 57 has its ends closed and sealed by the cylinder heads 55 and 56, this tubular member 57 preferably being concentric with the cylinder 54 thereby providing a surrounding space 58 about the cylinder 54, which space forms what is termed "the receiving chamber". A third tubular member 59 has its ends closed and sealed by the cylinder heads 55 and 56, said tubular member being concentric with the two previously mentioned tubular members 54 and 57, forming an annular space about the tubular member 57 which space provides the fluid reservoir 30.

Figure 2:
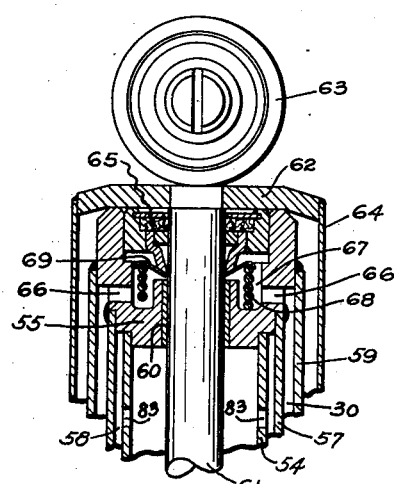
Fig. 2 is a fragmentary longitudinal sectional view taken through the shock absorber.
Figure 2:
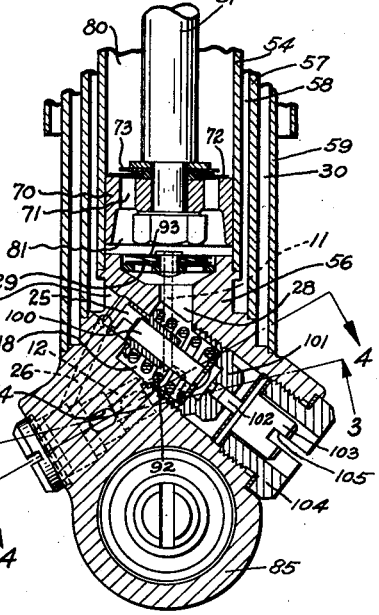

Referring to Fig. 2 it may be seen that the cylinder head 55 has a central opening supporting a bearing 60 which slidably supports the piston actuator or piston rod 61. This piston rod or actuator has a disc 62 secured at its end which extends outside the cylinder head 55 and to this disc is attached member 63 which is adapted to be hingedly secured to the frame 50 as shown in Fig. 1. One end of a tubular member 64 is attached to the disc 62 so that said tubular member 64 is substantially concentric with the tubular member 59. This tubular member 64 provides a dust cover for the shock absorber and is of sufficient length that it will substantially prevent any dust or dirt from reaching the sliding bearing between the piston actuating shaft 61 and the bearing 60. Any suitable packing as designated by the numeral 65 is provided in the cylinder head 55 so as to prevent fluid leaks. Transverse passages 66 are provided in the cylinder head, forming communication between the reservoir 30 and a recess 67 in the cylinder head 55. In this recess a spring 68 normally urges a wiper 69 into constant engagement with the piston actuator 61 so that any fluid which may leak past the actuator bearing will be wiped off and caused to drop into the recess 67 from where it may flow through the transverse passages 66 back to the reservoir, thus reducing the chances of fluid leaks at this end of the shock absorber.

The actuator or piston rod 61 has the piston 70 attached at its inner end in any suitable manner. This piston has ports 71 which provide for the transfer of fluid from one side of the piston to the other, the flow of fluid through said ports being controlled by the valve 72 normally urged to close said ports by a spring member 73 carried by the piston shaft.

Figure 5:
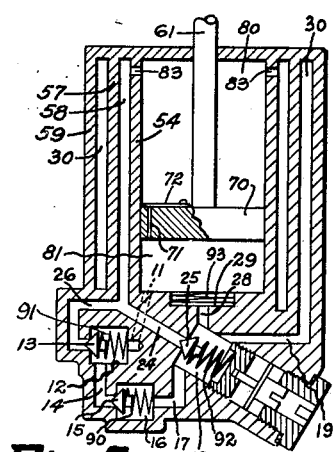
Fig. 5 is a diagrammatic view showing the shock absorber, its operating elements and their fluid connections.

From the aforegoing it may be seen that piston 70 within the cylinder 54 forms two fluid displacement chambers, the upper one, as regards Figs. 2 and 5, being designated by the numeral 80 and being termed the "spring rebound control chamber", the one at the opposite end of the piston, designated by the numeral 81, being termed the "spring compression control chamber". Figs. 2 and 5 also show that the spring rebound control chamber 80 is in communication with the receiving chamber 58 through transverse passages 83.

The cylinder head 56 has a member 85 similar to the member 63 on the disc 62, which member 85 is adapted hingedly to be secured to the axle 51. Cylinder head 56 carries certain of the fluid flow control devices of the shock absorber, the passages and chambers of which are arranged in such a complicated manner that it is deemed best to describe the operation of the shock absorber with reference to the diagrammatic view before structural description of this portion of the device is given.

In response to the upward thrust of the axle 51, due to the road wheels of the vehicle striking an obstruction in the roadway, the cylinder head 56, together with its tubular members 54, 57 and 59, will be thrust upwardly toward the frame 50, consequently causing the piston 70 to move downwardly into the cylinder, thus enlarging the spring rebound control chamber 80 and everting a pressure upon the fluid within the spring compression control chamber 81. In response to this pressure upon the fluid within this chamber it will flow in and through several fluid circuits. One of these is the fluid passage 71 in the piston 70. The fluid pressure acting through this passage 71 against valve 72 will lift the valve, thus permitting a fluid flow into the spring rebound control chamber 80. Another flow is established through the passage 11 leading from the spring compression control chamber 81 into a valve chamber 12. From this valve chamber 12 the fluid must flow into the duct or passage 14, for in chamber 12 the spring-loaded valve 13 may not be actuated by pressure from the passage 11. Now the fluid pressure acting through passage 14 is exerted against valve 15, moving said valve against the effect of its spring 90 to establish a flow into the valve chamber 16. From this chamber the flow will continue through the passage 17 into the valve chamber 18 and thence through passage 19 into the fluid reservoir 30. In chamber 18 a valve 25 is provided, which valve however may not be actuated to establish a flow from the chamber but into it as will be described. The circuit just described provides a restricted flow of fluid from chamber 81 into the reservoir 30.

As the piston 70 moves downwardly it may readily be seen that the piston rod or actuator 61 is displacing a certain amount of fluid within chamber 80 so that the fluid flow from chamber 81 through piston passage 71 past the valve 72, which is adapted to be actuated to open the port 71 at comparatively lesser pressure than that at which valve 15 will permit its flow, into chamber 80 will have a certain portion of it displaced by the piston actuator or rod 61, this displaced fluid flowing through transverse passages 83 into the fluid receiving chamber 58 which is of comparatively small size and substantially always completely filled with fluid. Communicating with this chamber 58 are two passages 24 and 26, the former leading to the valve 25 and being normally closed thereby, the latter leading to the valve 13 and being normally closed thereby. The fluid pressure in passage 26, however, will not move valve 13 from its seat against the effect of its spring 91, for a higher pressure is being exerted against the back of this valve due to the flow of fluid from chamber 81 through duct 11 into the chamber 12 containing said valve. However, the fluid pressure in the receiving chamber 58 acting through passage 24 will, if of a sufficiently high degree, move valve 25 against the effect of its spring 92 so that the fluid may flow from the receiving chamber into the valve chamber 18 where it will join the fluid flow from chamber 16 and flow through duct or passage 19 into the reservoir 30.

From the aforegoing it may be seen that chamber 81 has two routes by which the fluid therein may be transferred to the reservoir, the one including the valve 15 which has a comparatively light spring 90 and requires a low pressure to actuate it to permit fluid flow, the other route including valve 25 which has a heavier spring 92 and which requires a comparatively greater pressure to move it than does the valve 15.

As the axle 51 moves away from the frame 50 due to the action of the expanding spring 52, a reverse movement of the shock absorber obtains. Now the piston 70 is moved in the cylinder toward the cylinder head 55, thus the spring compression control member 81 is enlarged while pressure is being exerted upon the fluid within the chamber 80. Due to this pressure upon the fluid in chamber 80 it will flow through the transverse passages 83 into the fluid receiving chamber 58 from where it may flow through two different paths. First the fluid will flow from said receiving chamber 58 through the passage 26 against valve 13 which, having a comparatively light spring 91, will be moved at a comparatively low pressure within chamber 58 to permit a flow into its valve chamber 12 from where the fluid will flow through the duct 11 into the spring compression control chamber 81. An increased fluid pressure in chamber 58, which cannot properly be relieved by the valve 13, exerts a pressure upon valve 25 moving it against the effect of its heavier spring 92 to permit a flow into the chamber 18, thence through duct or passage 19 into the fluid reservoir 30. This restriction to the fluid flow from chamber 80 causes the shock absorber to resist the rebounding movement or the separating movement between the frame 50 and the axle 51 of the vehicle.

A duct 28 connects spring compression control chamber 81 with the valve chamber 18 and consequently with the reservoir 30 through duct 19. In this passage or duct 28 a valve 29 is provided, normally urged upon its seat by a spring 93. This valve 29 is adapted to prevent fluid from flowing from chamber 81 to the reservoir 30, however, in response to the movement of the piston 70 away from the cylinder head 56, valve 29 moves from its seat to establish a substantially free flow of fluid from the reservoir 30 through duct 90 into chamber 18 and thence through passage or duct 28 past the valve 29 into the chamber 81.

By referring to Fig. 2 in particular, it may be seen that the valve 25 is slidably carried on a valve stem 100, the spring 92 which urges said valve into normal position engaging an abutment collar supported within a recessed screw cap 101 threadedly received by the valve chamber 18. This screw cap 101 has a slot engaged by a tongue 102 provided by adjusting member 103 which is rotatably supported between sealing gaskets held in position in the cylinder head 56 by a screw cap 104 in which the screw cap 103 is rotatably contained. A screw driver or other suitable implement inserted in the slot 105 of screw cap 103 may rotate said screw cap 103 so that it in turn will rotate the screw plug 101 whereby said screw plug is moved into or out of the valve chamber 18 to increase or decrease the compression of spring 92. This of course results in the valve 25 being pressed upon its seat with a greater or lesser pressure, thus requiring a greater or lesser fluid pressure in passage 24 to lift said valve from its seat. Fig. 2 clearly shows the passage 24 communicating with the fluid receiving chamber 58.

Figure 3:
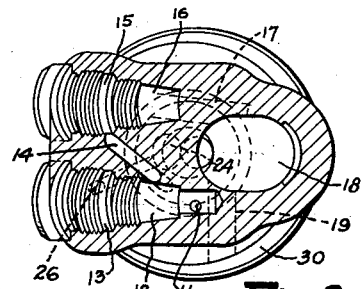
Fig. 3 is a detail sectional view taken substantially along the line 3—3 of Fig. 2.
Figure 4:
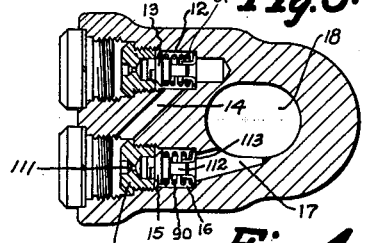
Fig. 4 is a detail sectional view taken substantially along the line 4—4 of Fig. 2.

The valve chamber 12 is shown in dotted lines in Fig. 2 and in full lines in Figs. 3 and 4. In Fig. 2 the section shows the passage 14 leading from the valve chamber 12. This passage is also clearly shown in Figs. 3 and 4, both figures showing the passage leading from valve chamber 12 to valve chamber 16. The passage 26 connecting valve 13 with the fluid receiving chamber 83 is illustrated in dotted lines in Figs. 2 and 3, this passage not appearing in the Fig. 4. The passage 24 connecting valve chamber 18 with the fluid receiving chamber 58 is clearly shown in Fig. 2, this passage being shown in dotted lines in Fig. 3 which is a section taken through the valve chamber 18. Fig. 4 clearly shows the passage 17 connecting valve chambers 16 and 18 which passage is shown in dotted lines in the Fig. 3. Passage 11 connecting the spring compression control chamber 81 with the valve chamber 12 is shown in dotted lines in Fig. 2 and in full lines in Fig. 3.

Any suitable valve construction may be used for the fluid flow control devices, but Fig. 4 shows a preferable construction for valves 13 and 15. Here the valve seat is shown as being a member 110, threadedly received by the valve chamber, the member having a small orifice 111 which provides communication between the valve and the approach chamber to the valve. The valve itself is mounted on a stem 112, slidably carried in a sleeve-like spider 113 which is engaged and urged upon its seat by the valve-spring, the opposite end of which engages the valve.

From the aforegoing it may be seen that applicant has provided a direct-acting shock absorber of simple structure and design, very compact and capable of controlling both the approaching and separating movements of the vehicle frame and axle. He has provided a device which may be produced commercially at a minimum cost and which may easily be assembled and may be adjusted from outside the shock absorber in order to vary its control of the vehicle ride.

While the embodiment of the present invention as herein described constitutes a preferred form, it is to be understood that other forms might be adopted, all coming within the scope of the claims which follow.

What is claimed is as follows:

1. A hydraulic shock absorber comprising, in combination, a casing providing a fluid reservoir and a cylinder; a piston forming two fluid displacement chambers within said cylinder; a piston actuating member extending through the one displacement chamber; passages connecting the second displacement chamber with the reservoir; a valve in one of said passages providing for a substantially free flow of fluid from the reservoir into said second chamber in response to the movement of the piston in one direction; other passages connecting the said one displacement chamber with the first mentioned passages; a check valve in one of said other passages, adapted to permit fluid to flow from said one displacement chamber into the first mentioned passages in response to the movement of the piston in said one direction; interconnected branch passages leading from said other passages into the second displacement chamber and into the first mentioned passages; and two check valves in said branch passages adapted to be actuated by fluid pressure acting in the same direction.

2. A hydraulic shock absorber comprising, in combination, a casing providing a fluid reservoir and a cylinder; a piston forming two fluid displacement chambers within said cylinder; a piston actuating member extending through the one displacement chamber; interconnected passages providing communication between the said one displacement chamber and the reservoir; a valve in one of said passages adapted to be actuated by fluid pressure to permit fluid to flow from said chamber into the reservoir; a branch passage leading from one of said interconnected passages into the second displacement chamber; a valve in said branch passage adapted to permit fluid flow from said interconnected passages to said second chamber in response to fluid pressure; a valved passage connecting the discharge side of both the aforementioned valves; and a valved passage connecting the said second displacement chamber with the discharge side of the valve in the interconnected passages.

3. A hydraulic shock absorber comprising, in combination, a casing providing a fluid reservoir and a cylinder; a piston forming two fluid displacement chambers within said cylinder; a piston actuating member extending through the first displacement chamber; interconnected passages connecting the first displacement chamber with the reservoir; a valve in one of said passages adapted to be actuated by fluid pressure to permit fluid to flow from said first chamber into the reservoir; a branch passage leading from said interconnected passages into the second displacement chamber; a valve in the branch passage adapted in response to a comparatively lower pressure than the aforementioned valve to permit fluid flow from said interconnected passages to said second chamber; a duct connecting the discharge side of both valves mentioned; a valve in said duct adapted in response to fluid pressure in said second displacement chamber to permit fluid to flow from said chamber into the interconnected passages leading into the reservoir; and an inlet duct leading from said second chamber into one of the interconnected passages connecting with the reservoir and on the discharge side of the valve in said passage, said inlet duct having a valve adapted to permit fluid to flow from the reservoir into said other chamber.

4. A hydraulic shock absorber comprising, in combination, a casing providing a fluid reservoir and a cylinder; a piston in said cylinder forming two fluid displacement chambers therein; a piston actuating member extending through the one displacement chamber; means adapted to permit a restricted flow of fluid from the other displacement chamber into the reservoir as the piston moves in one direction; means adapted to permit a restricted flow of fluid from said other displacement chamber into the said one displacement chamber as the piston moves in said one direction; means including a check valve for permitting the fluid displaced by the piston actuating member to flow from said one chamber into the reservoir, said check valve being adapted to permit a restricted flow of fluid from said one chamber into the reservoir as the piston moves in the opposite direction; means adapted to permit a restricted flow of fluid from the said one chamber into the other as the piston moves in said opposite direction; a means for establishing a substantially free flow of fluid from the reservoir into said other chamber when the piston is moving in said opposite direction.

5. A hydraulic shock absorber comprising, in combination, a casing providing a fluid reservoir and a cylinder; a piston forming two fluid displacement chambers in said cylinder; a piston actuating member extending through the one displacement chamber; means providing for a controlled fluid flow from said one chamber into the other as the piston moves in one direction; a second means providing for a controlled fluid flow from said one chamber into the reservoir as the piston moves in said one direction; means providing for a controlled fluid flow from the other displacement chamber into the reservoir as the piston moves in the opposite direction; and means providing for a flow of fluid from said other chamber into the chamber with the piston actuating member therein, the second means providing for a portion of this last fluid flow to flow to the reservoir as the piston moves in said opposite direction.

6. A hydraulic shock absorber comprising, in combination, a casing providing a fluid reservoir and a cylinder; a piston forming two fluid displacement chambers in said cylinder; a piston actuating member extending through the one displacement chamber; means providing for a controlled fluid flow from said one chamber into the other as the piston moves in one direction; a second means providing for a controlled fluid flow from said one chamber into the reservoir as the piston moves in said one direction; means providing for a controlled fluid flow from the other displacement chamber into the reservoir as the piston moves in the opposite direction; and means responsive to the movement of the piston in the said opposite direction providing for a flow of fluid from said other chamber directly into the chamber having the piston actuating member therein, the portion of the fluid in said chamber displaced by the piston actuating member being directed to the reservoir through the aforementioned second means.

7. A hydraulic shock absorber comprising, in combination, a casing providing a fluid reservoir and a cylinder; a piston forming two fluid displacement chambers in said cylinder; a piston actuating member extending through the one displacement chamber; a spring-loaded valve responsive to a predetermined fluid pressure to permit fluid to flow from the actuator containing displacement chamber into the other chamber as the piston moves in one direction; a second spring-loaded valve responsive to a comparatively higher fluid pressure to permit fluid to flow from the actuator containing chamber into the reservoir as the piston moves in the said one direction; a valve in the piston actuated by a predetermined fluid pressure to permit fluid to flow from said other displacement chamber into the actuator containing chamber as the piston moves in a direction opposite to that mentioned above, the portion of this fluid flow displaced by the piston actuator operating the said second spring-loaded valve to permit fluid to flow into the reservoir; a third spring-loaded valve permitting fluid to flow from said other chamber into the reservoir at a fluid pressure comparatively lower than that which operates said second valve; and a valve adapted to establish a substantially unrestricted flow of fluid into said other chamber, as the piston moves in the first mentioned direction.

8. A hydraulic shock absorber comprising, in combination, a casing providing a fluid reservoir and a cylinder; a piston forming two fluid displacement chambers in said cylinder; a piston actuating member extending through the one displacement chamber; two spring loaded means controlling the discharge of fluid from the actuator containing displacement chamber as the piston moves in one direction, the one means directing its fluid flow into the second displacement chamber, the other means directing its flow into a passage connected with the reservoir; means in said passage, providing for a substantially unrestricted flow of fluid from the reservoir through said passage into said second chamber in response to said piston movement; two spring-loaded means controlling the discharge of fluid from said second displacement chamber, one directing fluid into the passage connected with the reservoir the other into the actuator containing chamber, said last mentioned chamber discharging a portion of its fluid into the receiving chamber and the receiving chamber into the passage connected with the reservoir, due to the presence of the piston actuator in said displacement chamber.

9. A hydraulic shock absorber comprising, in combination, a cylinder; a piston in said cylinder forming two fluid displacement chambers therein; a piston actuating member extending through one of said chambers; a receiving chamber; a fluid reservoir; a spring-loaded valve adapted to permit a restricted flow of fluid from the second displacement chamber into the reservoir in response to a predetermined fluid pressure, as the piston moves in one direction; a spring-loaded valve in the piston adapted to permit a flow of fluid from said second displacement chamber into the displacement chamber having the piston actuator as the piston moves in said direction, said actuator causing a part of the fluid entering said displacement chamber to flow into the receiving chamber; a valve actuated by fluid pressure in the receiving chamber to permit a fluid flow from said receiving chamber into the reservoir; another spring-loaded valve adapted to permit fluid to flow from said receiving chamber into the second displacement chamber; and a valve for permitting a substantially free flow of fluid from the reservoir into said last mentioned chamber.

10. A hydraulic shock absorber having a concentrically arranged cylinder, receiving chamber and fluid reservoir all in communication with each other; a piston in said cylinder forming two fluid displacement chambers; a piston actuating member extending through the one displacement chamber; a duct leading from the reservoir and having two branch portions opening into the displacement chamber not containing the actuator; a check valve in the one branch of the duct, adapted to permit fluid to flow substantially unrestricted from the reservoir into said displacement chamber as the piston moves to enlarge said chamber; a check valve in the second branch of the duct adapted to provide a restricted flow of fluid only from the said chamber into the reservoir as the piston moves to decrease the size of said chamber; a passage having a check valve and connecting the receiving chamber with the said duct and providing for a restricted flow of fluid from said chamber into said duct as the piston moves to decrease the size of the displacement chamber containing the piston actuating member, another passage containing a check valve and leading from the receiving chamber into the second branch of the duct providing for a restricted flow of fluid from said receiving chamber into the displacement chamber not containing the piston actuator; and a valved passage in the piston providing for the direct transfer of fluid from one side of the piston to the other.

FREDERICK D. FUNSTON.